Feb. 15, 1966 W. C. GEORGE 3,235,432
COMPOSITE STRUCTURE AND METHOD OF FORMING SAME
Filed June 18, 1962 5 Sheets-Sheet 1
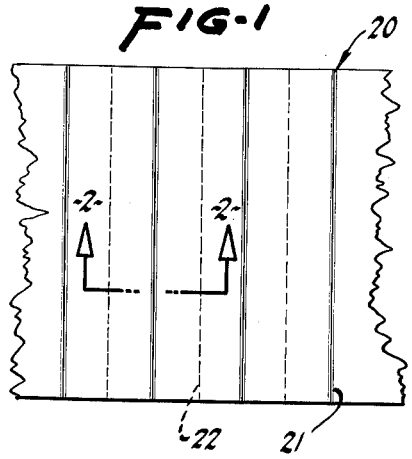
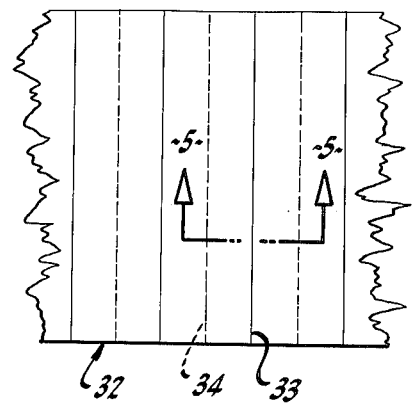
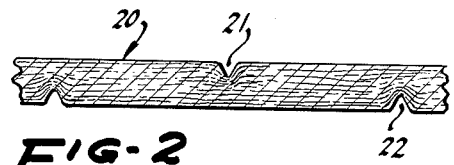
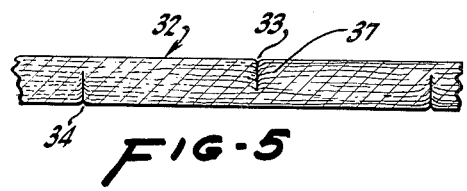
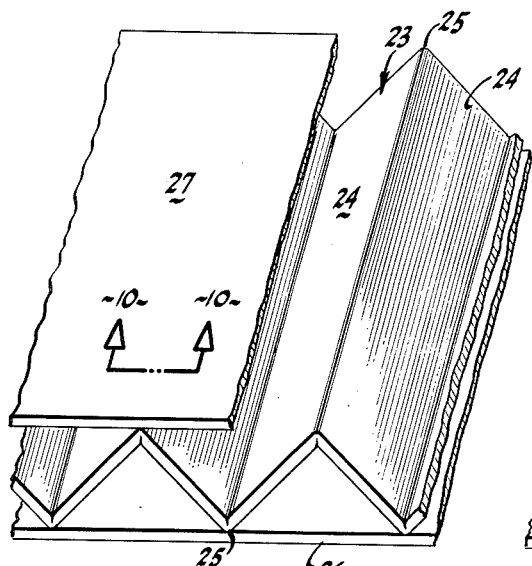
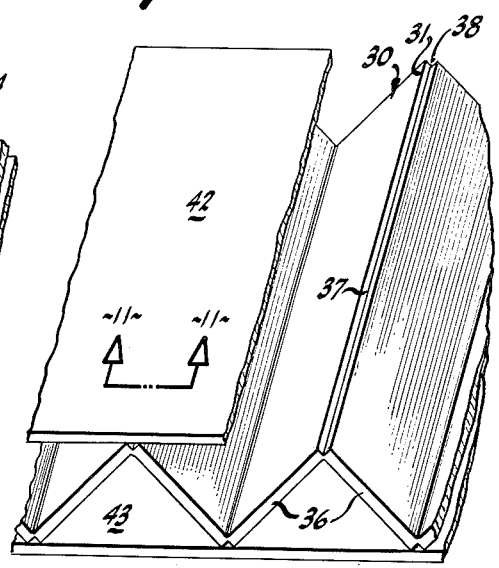
INVENTOR.
WALTER C. GEORGE
BY
ATTORNEY

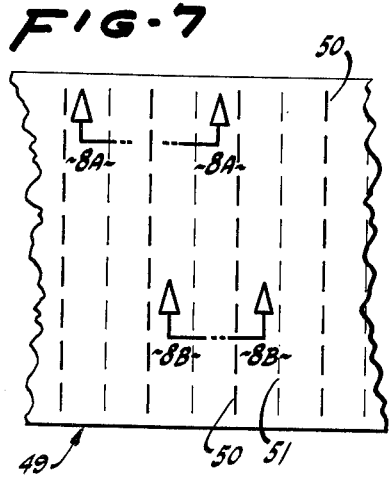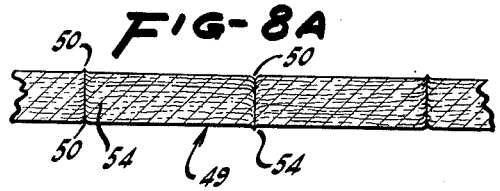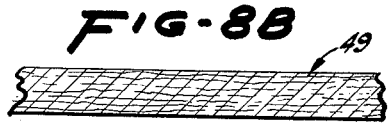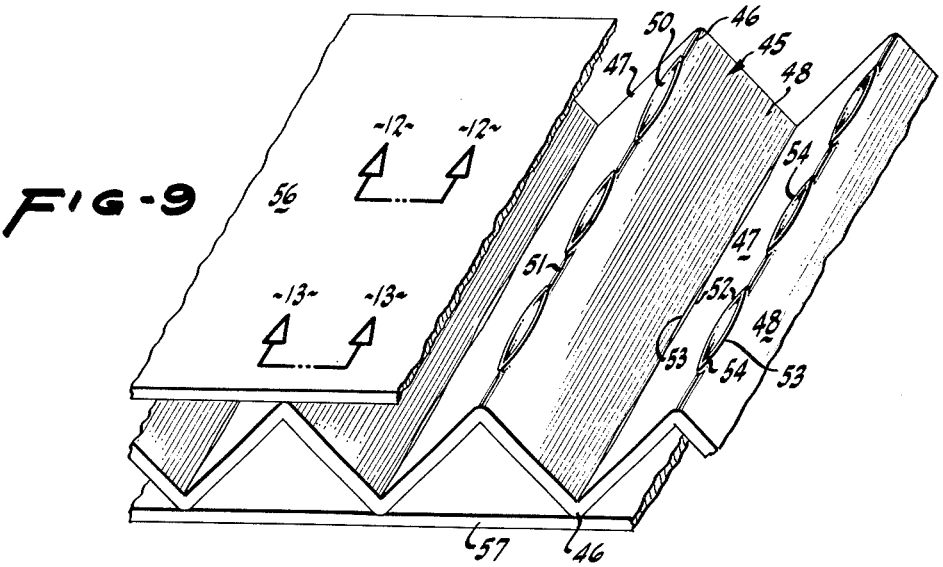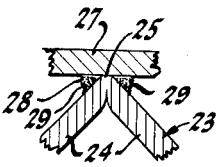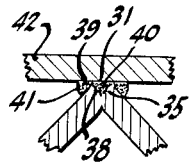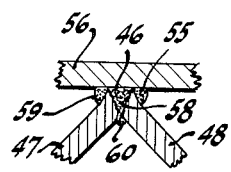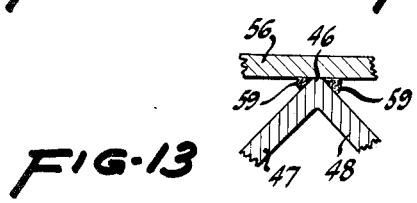
INVENTOR.
WALTER C. GEORGE
ATTORNEY Feb. 15, 1966 W. C. GEORGE 3,235,432
COMPOSITE STRUCTURE AND METHOD OF FORMING SAME
Filed June 18, 1962 5 Sheets-Sheet 3

INVENTOR.
WALTER C. GEORGE
BY William Nye
ATTORNEY

Feb. 15, 1966 W. C. GEORGE 3,235,432
COMPOSITE STRUCTURE AND METHOD OF FORMING SAME
Filed June 18, 1962 5 Sheets-Sheet 4

INVENTOR.
WALTER C. GEORGE
BY
ATTORNEY

Feb. 15, 1966   W. C. GEORGE   3,235,432
COMPOSITE STRUCTURE AND METHOD OF FORMING SAME
Filed June 18, 1962   5 Sheets-Sheet 5
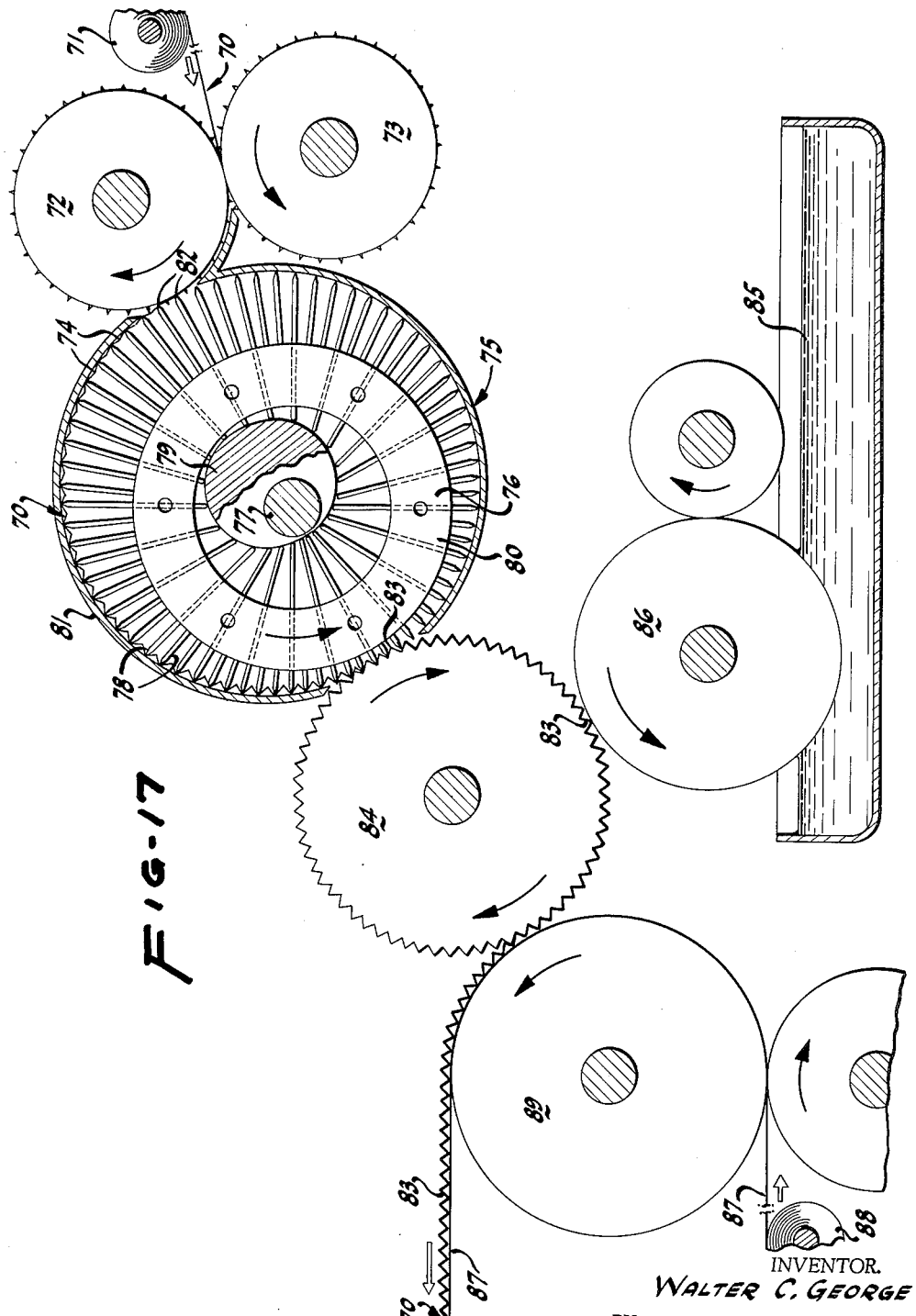
INVENTOR.
WALTER C. GEORGE
BY
ATTORNEY United States Patent Office 3,235,432
Patented Feb. 15, 1966

3,235,432
COMPOSITE STRUCTURE AND METHOD OF FORMING SAME
Walter C. George, St. Louis, Mo., assignor to Crown Zellerbach Corporation, San Francisco, Calif., a corporation of Nevada
Filed June 18, 1962, Ser. No. 203,275
4 Claims. (Cl. 156—201)

This application is a continuation-in-part of co-pending application Serial Number 701,201, filed December 6, 1957, and entitled "Composite Paperboard," which application is now abandoned.

The present invention may be classified as falling in the category of corrugated board formed of relatively thin readily bendable flexible sheet material comprising a corrugated medium and at least one reinforcing sheet.

The invention primarily relates to the field of corrugated fibreboard packaging materials but it is also applicable for use with other materials of a similar character. The characteristics of such materials may be generally described as being of a flexible nature such that they may be readily rolled or otherwise bent or deformed at random and at will and further characterized by having negligible resistance to compressive forces exerted edgewise of the material prior to being formed into a composite board structure.

With reference to the corrugated paperboard industry, it has for years supplied composite paperboard to the trade consisting of an intermediate undulated corrugated paperboard medium in combination with inner and outer facings or liners adhesively attached to the intermediate corrugated medium. This adhesive attachment is effected at the crest of the undulations or corrugations commonly known as the tips of the flutes. In this regard, it is to be noted that such flutes having substantially the conformation of a sine wave are characterized by having tips providing substantial surface area in contact with the linerboards whereby the adhesive bond may be effected without undue difficulty. It has been recognized in the industry that this undulated flute structure has several disadvantages and considerable effort has been expended towards improving the structural conformations of undulated corrugated boards.

In recent years these efforts have even been directed towards reducing the arc at the flute tips whereby the walls, so to speak, of the flutes are rendered substantialy nearer a planar condition to effect greater uniformity and in an attempt to improve the strength characteristics of such boards. Such attempts, while they have met with some success, have been merely a change in degree and not in kind of corrugated board structures. In contrast, the present invention constitutes a unique and forward step in the art wherein flute structures are formed by sharply folding the corrugating medium about pre-determined lines of weakness or fold lines whereby the walls of the flutes are rendered truly flat and planar and therefore maintain their inherent strength in its entirety and are rendered capable of resisting stress and deformation as are commonly encountered in the packaging arts.

This invention not only provides the advantagecus planar walled sharply folded corrugated structure but also provides a unique method of forming such structures whereby they are capable of manufacture on high speed, continuously running machinery, comparable in productive capacity to conventional corrugated board machines but involving a greatly simplified process whereby such machines may be reduced markedly in size and thereby offering great savings in cost and manufacturing space. Conventional undulated corrugated boards being of an arcuate structure give rise to a demanding set of operations in their formation including the application of heat and moisture to the corrugating medium to plasticize the same and permit formation of the arcuate structure between paired, meshing, fluted forming rolls. Necessarily this arcuate structure must then be "set" by heat and pressure if the flutes are to have any significant strength as there is to be found in the arcuate walls of the flutes the initiation of collapsing movements and in order to resist this result and to rigidify the structure this setting operation is essential. The setting operation also attempts to eliminate the stresses in the corrugating medium resulting from the corrugating operation. The foregoing circumstances in combination with water base adhesives necessitate that the corrugators be of a substantial length, in the order of 300 feet, to dissipate the moisture in a lengthy drying section.

In contrast the present invention, in providing a novel sharply folded structure wherein the planar walls are unstressed and unmodified as by "setting" of the flute formation, is formed by a simplified process wherein the dimensional relationships of the flutes are particularly determined by pre-applied parallel lines of weakness thus eliminating the prior art discrepancies including so-called high and low corrugations, leaning corrugations and cracking of the corrugated medium during the formation thereof.

The manufacture of the present day undulating type corrugated medium as described before is facilitated, particularly at relatively high production speed, by reason of the relatively wide area at the tips of the corrugated medium which provides a generous surface for the reception of glue or adhesive and thereby is characterized by a substantial area for an adhesive bond to an adjacent liner or facing sheet. Thus, the inherent difficulty encountered in adhesively or otherwise securing the relatively narrow tips of the straight sided corrugated medium of the subject invention, to adjacent liner or facing sheets was not encountered in the manufacture of existing undulating corrugated type composite board. The difficulty of adhering the corrugated medium of the present invention to an adjacent liner or facing sheet is further amplified in the advantageous, sharp crested V-shaped form of the invention in which the available surface area at the crest is essentially a relatively narrow line rather than a broad, relative wide surface as in the undulating corrugated form employed at the present time.

The present invention, additionally provides in advantageous embodiments, means for the novel adhesive attachment of the new corrugating medium by altering the tips thereof to expose the inner medium fibres. The exposing of the corrugated medium inner fibres allows the adhesive to contact and engage said inner fibres independent of impermeable coatings or laminants on the surface of the medium, overcoming adhesive bonding problems previously considered impossible in the existing undulated corrugated medium wherein the interior fibres are not exposed. Additionally in advantageous forms of the invention, in which the lines of weakness are partially severed, openings are provided in which the adhesive may enter, in addition to its ordinary bonding function, to act as a reinforcing element at the tips of the new corrugated medium.

Unexpectedly, it has been found that the present invention provides advantages in that the facing or liner boards of the completed structure are characteristically of a desirable and advantageous flat, planar and smoother condition avoiding the common "wash boarding" and pressure roll marks which are inherent in prior art composite boards utilizing undulating medium, due to the necessary pressure and stresses involved in the corrugating operation.

It is therefore an object of the present invention to provide a composite panel paperboard advantageously comprising a novel intermediate, substantially sharply folded corrugated medium and with adhesively attached facing sheets or linerboards and such composite paperboard requiring a minimum of materials as regards the advantageous V-shaped intermediate member and possessing overall superior qualities such as adaptability to fabrication from inelastic components and adhesive resistant materials.

Another object of the invention is to quite radically depart from the utilization of the conventional undulated or corrugated intermediate medium for corrugated paperboard and in lieu thereof provide an entirely new intermediate medium for corrugated paperboard and this intermediate medium when combined with or having attached thereto the opposed facing sheets or linerboards, resulting in an overall composite board of very unexpected and unusual strength characteristics and other qualities and such qualities being totally absent from the known corrugated paperboard and presently not known to the corrugated paperboard industry.

Another object of the invention is to provide a novel and very unusual intermediate, substantially sharply folded corrugated medium having relatively sharp edges or apexes and these edges being of such character as to have an unusual facility to allow the adhesive to in a unique way not only to serve to join the respective opposite facing sheets to the intermediate member at the edges thereof but also to rigidize the intermediate member at the edges so as to permanently immobilize these edges with respect to their opposite facing sheets and with respect to each other.

Another object of the invention is to provide a composite board including the new intermediate, substantially V-shaped corrugated medium with the sharp edges defined at the folds and with the panels or wall of the V-shaped corrugations being planar throughout and this structure of the intermediate member characterized by the attachment of the edges or apexes of the V-shaped folds to the respective inner and outer facing sheets or linerboard.

Another object of the invention is to provide a method of forming corrugated board wherein continuous sheets of flexible materials may be advanced for example from a roll formation and subjected to the application of predetermined parallel lines of weakness whereby the flexible medium may be sharply folded about the lines of weakness to form planar walled flute structures of precise and uniform conformation.

Still another object is to provide a method whereby flexible materials may be formed into uniform flute structures wherein the flexibility of materials is controlled by the application of predetermined lines of weakness to permit the precise folding of the medium at said lines of weakness with the intervening portions of the flexible material unaltered and unstressed.

Still a further object of the invention is to provide in an advantageous method for forming a corrugated board structure as previously described wherein the predetermined lines of weakness are severed in part to facilitate the folding thereof and to facilitate the disposition and the bonding of the adhesive to the sharply folded flute structures in the combining of the fluted medium to facing sheets.

These and other objects and advantages of the invention will be apparent to those skilled in the art upon a full and complete understanding of the construction and operation of the device as hereinafter set forth.

The accompanying drawings form a part of this specification and like numerals and symbols therein appearing refer to like parts wherever they occur.

In the drawings:

FIGURE 1 is a top plan view of an alternately scored continuous flexible web of indeterminant length from which advantageous substantially V-shaped corrugations may be formed;

FIGURE 2 is an enlarged cross sectional view of the flexible web along line 2—2 of FIGURE 1, looking in the direction of the arrows;

FIGURE 3 is a view in perspective of a composite structure showing an intermediate corrugated medium formed from the flexible web of FIGURES 1 and 2 disposed between facing sheets or linerboards;

FIGURES 4, 5 and 6 are views similar to FIGURES 1, 2 and 3 but showing a different adaptation of the invention wherein the corrugating web is provided with alternate slits or cuts extending partially therethrough;

FIGURES 7, 8A, 8B and 9 are views similar to FIGURES 1, 2 and 3 but showing still another adaptation of the invention wherein the corrugating web is provided with alternate, intermittent cuts extending therethrough;

FIGURE 10 is a sectional view taken along line 10—10 of FIGURE 3, looking in the direction of the arrows;

FIGURE 11 is a sectional view taken along line 11—11 of FIGURE 6, looking in the direction of the arrows;

FIGURE 12 is a sectional view taken along line 12—12 of FIGURE 9, looking in the direction of the arrows;

FIGURE 13 is a sectional view taken along line 13—13 of FIGURE 9, looking in the direction of the arrows;

FIGURE 17 is a schematic view of a device for fabricating an embodiment of the invention.

Figure 14:
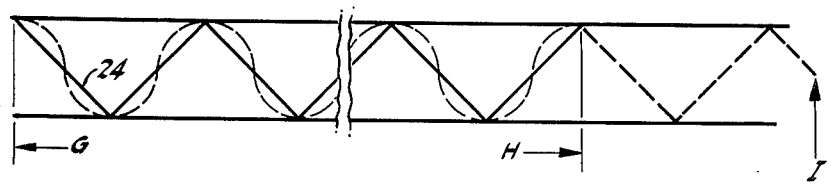
FIGURE 14 is a diagrammatic illustration of the known undulated corrugated medium combined with the present V-shaped corrugated medium and showing the additional amount of the medium obtained by utilizing the present invention.

FIGURES 1, 2 and 3 illustrate a particular embodiment of the invention in which a flexible web 20 of paper or similar bendable material is embossed or scored at regular spaced apart lines which are alternately impressed on opposite sides of the web 20. The scores are denoted as 21 and 22 and constitute fold lines or lines of weakness about which the web 20 may be sharply folded in succession into a corrugated medium 23 as most clearly illustrated in FIGURE 3. The corrugated medium 23 is comprised a continuous series of V-shaped flutes having planar walls 24 extending between apexes 25 defined by the alternate scores 21 and 22. A liner or facing sheet 26 may be fixedly secured to the corrugated medium 23 for example by means of a suitable adhesive (not shown but illustrated and described later in detail). A second liner or facing sheet 27 may be fixedly secured to the corrugated medium 23 in a similar manner.

Referring in particular to the alternate scores 21 and 22, in the embodiment described the scores are continuous lines of indentations or impressment formed by blunt edge scoring rules, scoring wheels or similar means which do not act to sever or cut the flexible web 20 and consequently do not expose or free internal fibers but merely serve to impress the continuous channel like indentations as shown in FIGURES 1 and 2.

The alternate scores 21 and 22 serve to precisely determine the lines about which the flexible web may be folded into the corrugated medium 23 and thereby insure that the flutes will be uniform when secured to one or more liners or facing sheets such as 26 and 27.

Adhesive generally shown at 28, FIGURE 10, adhers and permanently anchors the sharp, pointed apexes 25 of the corrugated medium 23 to adjacent portions of the facing sheets 26 and 27. The adhesive 28, in addition to permanently securing the apexes 25 in position relative to each other and to the respective facing sheets 26 and 27, further serves the purpose of reinforcing and rigidifying the apexes 25 of the corrugated medium 23. It will thus be seen that the adhesive 28 serves a dual function in that it rigidifies the apexes 25 and the opposed planar walls 24 of the corrugated medium 23 and permanently anchors these apexes 25 to the facing sheets 26 and 27. Gusset or fillet like portions 29 of the adhesive 28 are disposed on each side of the apexes 25 between the planar walls 24 and facing sheets 26 or 27 to provide a rigid determination of the angle of juncture between each planar wall 24 and the adjacent facing sheet 26 or 27 and thus serves to further define and reinforce the included angle between the planar walls 24 of any given flute.

As to the adaptation or modification of the invention shown in FIGURES 4, 5 and 6, modified V-shaped corrugated medium 30 is folded and has the sharp edges or apexes 31. These apexes 31 are unique in the corrugated paperboard field in that, as will be noted from the section of the web 32 shown in FIGURE 4 from which the corrugated medium 30 has been fabricated or folded, this web 32 is severed through part of its thickness by means of a cut or slit score 33 at equally spaced apart distances throughout the web 32 on one side and is likewise slit scored at 34 on its other side as clearly seen in FIGURE 5. The slit scores 33 and 34 may be continuous or if desired spaced with connecting portions left therebetween, but still determining a line of weakness to define a fold line. The slit scores 33 and 34 extend into the web 32 in right angular relationship to the flat surface thereof and provide side edges 35 of planar walls 36 and thereby form openings in the web while exposing internal fibers 37 of the corrugated medium 30. When the slit scored corrugated medium 30 is alternately folded about the slit scores 33 and 34 into corrugated relationship it will be noted that the side edges 35 tend to open up or separate into angular relation thereby defining a trough-like opening 38 along the apexes 31 even though material is not removed in the formation of the slit scores 33 and 34. Because of such slitting or cutting partially through the material, internal fibers adjacent the fold line formed by the cut become frayed and freely exposed, and thus provide a firm strong anchoring bond in adhesive subsequently applied thereto.

Now referring to FIGURE 11, it will be seen that adhesive 39 is applied to the apexes 31. The adhesive 39 is disposed in the trough 38 as at 40 and with additional fillet portions 41, said fillet portions 41 are described in detail in the hereinbefore description of FIGURE 10. In the embodiment of the invention as shown in FIGURE 11, there is provided an additional advantage in that the adhesive portion 40 is in contact and engagement with the free fibers 37 of the edges 35 whereby the fibers are anchored in the adhesive to further provide secure bonding of the apexes 31 and facing sheets 42 and 43.

As to the adaptation or modification as shown in FIGURES 7, 8 and 9, here the V-shaped corrugated medium 45 includes the sharp edges or apexes 46 throughout their length and the formation of the V-shaped flutes provided by the planar opposed inclined connected together walls 47 and 48, but, as will be seen from the flexible web 49, FIGURE 7, from which the composite paperboard in FIGURE 9 has been fabricated, the web is severed in part to provide a series of in-line openings in the form of perforations or other openings 50 that extend completely through the same and which also result in free anchoring fibers. These lines 50 in the embodiment described are equally spaced apart and provide lines of weakness for the folding of the flexible web 49 into V-shaped corrugated medium 45. These fold lines, therefore, with the openings 50, are at the top edges of the apexes 46 and the openings are in these top edges.

Dealing with the perforations 50 more particularly, it may be seen in the cross sectional view, FIGURE 8A, that the individual openings in the lines of perforation extend entirely through the flexible web 49. Such openings may be suitably formed by impinging a sharp edged cutting rule, not shown, having a notched or serrated edge to provide the aligned cut openings and the unsevered portions 51 therebetween. The openings or perforations are thus determined by paired substantially straight free edges 52 and 53 which in turn determine free edge portions of the respective planar walls 47 and 48 and thus expose the internal fiber structure 54 of said walls. Upon the folding of the planar walls 47 and 48 about the lines of perforation 50 into the multiple fluted structure as shown in FIGURE 9, the openings 50 tend to open up on the outer surface or extremity of the apexes 46 for the reception of adhesive therein in contacting engagement with the fibers 54 for secure engagement of the liners or facings 56 and 57 to the narrow sharp line of fold which comprises the apexes 46. As shown, the fibers 54 tend to actually protrude and thereby maximize the surface bonding area adapted to adhesive reception.

The adhesive 55, as clearly shown in FIGURE 12, is disposed along the apexes 46 and, in a manner similar to the hereinbefore described disposition of adhesive in relation to FIGURES 6 and 11, includes portions 58 within the openings 50, and fillet portions 59 in the angle of juncture between the respective planar walls 47 and 48 and the facing members 56 and 57 to attain the previously described rigidity and secure bonding. In addition, the adhesive, in varying quantities depending on viscosity, temperature, characteristics of the corrugating, is adapted to penetration through the openings 50 to provide internal portions 60 thereof disposed in the included angle between the respective paired planar walls 47 and 48 of the flutes to further rigidify the angle of said walls and, in effect, providing a rivet like adhesive structure adding further to the bond strength between the facings 56 and 57 and the corrugated medium 45.

In addition to the hereinbefore described advantages of the invention, the saving of the corrugated medium material is significant and this saving is graphically depicted in FIGURE 14. In this FIGURE 14, the broken line illustration denotes a conventional A flute corrugated medium transposed over applicant's unique V-shaped corrugated medium. Note the savings in the material for providing the planar wall 24, for example, of the flutes in applicant's V-shaped corrugated medium as distinguished from the curved portions that extend to the right and left of the planar lines denoting the sine-like curve A-flute of the known, conventional corrugated medium in FIGURE 14. This saving of material is illustrated at the right hand end of the graphic illustration in FIGURE 14 by that portion between the lines H and I. It is understood that the identical amount of the paperboard forming applicant's unique V-shaped corrugated medium shown in FIGURE 14 and that applicant comes out of it with the amount of this medium for additional use as indicated by these lines H and I per linear foot. Actually the designation G and H in FIGURE 14 of the drawing is meant to show the 36 corrugations per linear foot of the conventional A flute corrugated medium and thus the obvious savings of material by using applicant's new V-shaped corrugated medium as shown between lines H and I in FIGURE 14 for a linear foot. Likewise, corresponding savings of material are attained when comparing applicant's V-shaped corrugated medium and conventional other sizes of standard corrugated paperboard material.

Figure 15:
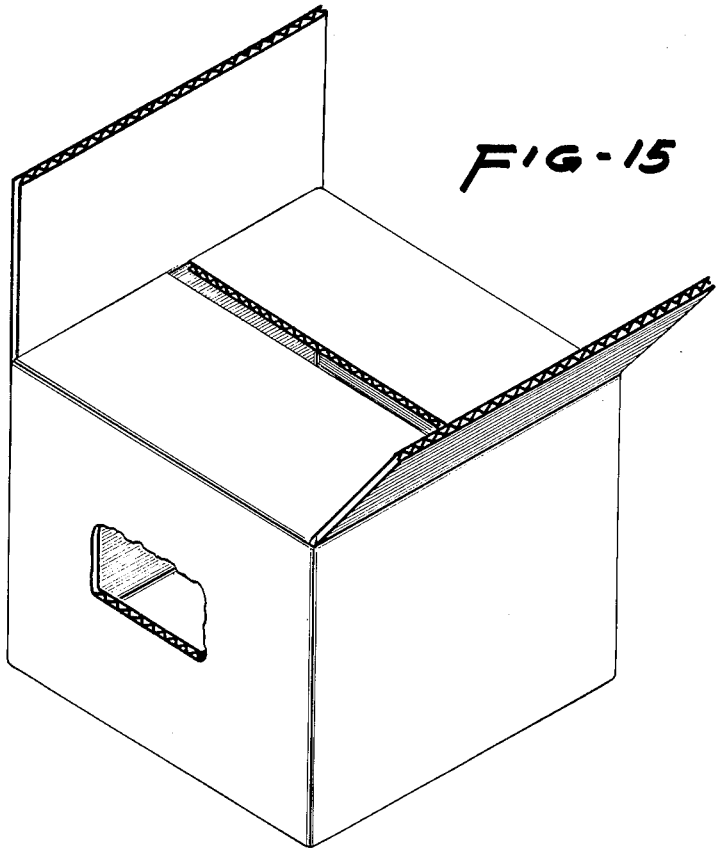
FIGURE 15 is a perspective view of a shipping container formed from a composite structure embodying this invention.

An important field, yet by no means the only field for utilizing the new article of manufacture, is for all of the purposes for which the known corrugated paperboard formed with undulating or sine-like curved corrugated medium is employed. This includes boxes as, for example, shown in FIGURE 15 which shows a conventional one piece shipping container commonly known in the industry as a regular slotted carton. This container may be constructed of the novel corrugated board in accordance with the various embodiments of the present invention as best shown in the cut-away portions of the figure wherein the sharply folded flute structure is illustrated. The composite board structure of the present invention is adaptable to being fabricated from flexible paper materials such that shipping containers and other packaging material in their many forms may be constructed by means of ordinary box plant equipment and methods. The novel container board of the invention is readily cut, scored, slotted and folded into suitable forms for packaging.

The range of angles enclosed by each pair of adjacent V-shaped walls may be varied over a relatively wide range, but for practical purposes the preferred range is between 30° to about 120°. This ability to vary the enclosed angles permits the selection of strength and/or cushioning properties to best satisfy particular packaging needs.

The corrugated medium of the present invention may, if desired, be formed with thirty-six flutes per linear foot and height of $3/16$ inch to correspond to known A flute corrugated board. In this instance, the angles enclosed by the V-shaped corrugated elements or walls at their apexes are approximately 84°.

The invention may be practiced ultizing any suitable combination of unscored portions, creased portions, slits, cuts, or perforations or openings of the corrugating medium in either singly or in any other suitable combination or arrangement with each other.

It will be noted that with respect to the embodiments of FIGURES 4 through 6, and FIGURES 7 through 9, even though the lines of weakness thereof are formed by penetration through the corrugated medium, the uncut connecting portions provide for strength when the sheet is folded along the lines of weakness. It is desirable in the case of continuous slit scoring and also in the case of spaced apart connecting portions formed by perforations, that uncut material be in the order of at least 25% of the board, whether it is through the thickness of the board in the case of continuous slit scoring or transversely of the corrugated medium in the case of perforations. However, the amount of uncut material may vary depending upon the physical characteristics of the corrugated medium.

Not only does this unsevered portion of the corrugated medium provide for strength but also in manufacturing operations where the corrugating medium is pulled under tension in winding and unwinding at high speeds, which is permitted by virtue of the flexibility of the sheets, the substantial amount of intact material remaining along the lines of weakness or fold lines is sufficient to avoid accidental severing or tearing along said fold lines.

It is an important concept of this invention that the novel straight sided corrugated medium has the advantage that the flat sides are exactly equal in length to the distance between adjacent or successive glued connections at the fold lines as determined by the distance between adjacent lines of weakness in accordance with the several embodiments of the invention. This is contrasted to the curvilinear sides of present corrugated medium in the paperboard field which are inherently greater in length than the actual distance between the adjacent glued connections between reinforcing plies. The resulting structure of applicant's invention therefore has the advantage of providing the most efficient use of the material of the corrugated medium in a manner not heretofore known in the paperboard industry. In effect, a "kinematic locked linkeage" is provided which is advantageously formed against compression, shear and other forces.

Figure 16:
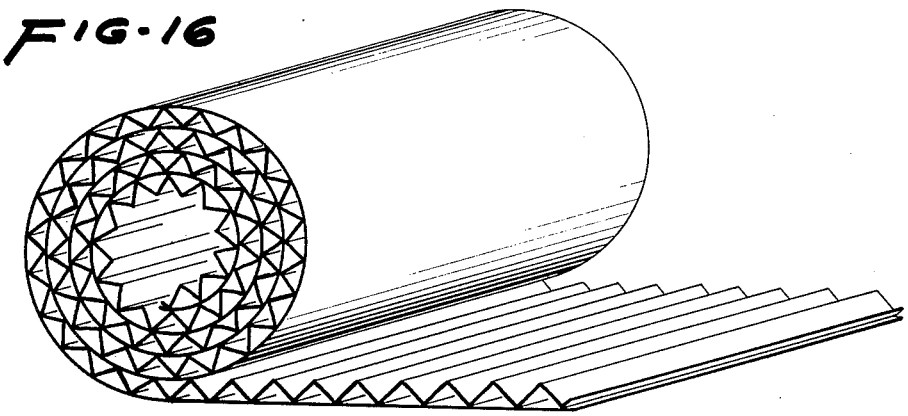
FIGURE 16 is a perspective view of a roll of composite structure embodying this invention in which only one liner or facing sheet is employed.

Although the described embodiments have advantageous characteristics for resisting compression or flat crush forces asserted against the liner or facing sheet in a direction normal thereto, the composite board, when only one liner or facing sheet is employed as shown in FIGURE 16, is still capable because of flexibility in a direction extending transversely of the corrugations, of being wound in roll form for transportation or shipment. In this form the composite board is commonly referred to in the paperboard industry as "singleface board," thus such singleface board can be used in rolled flexible form as a wrapper for bottles and the like.

Figure 18:
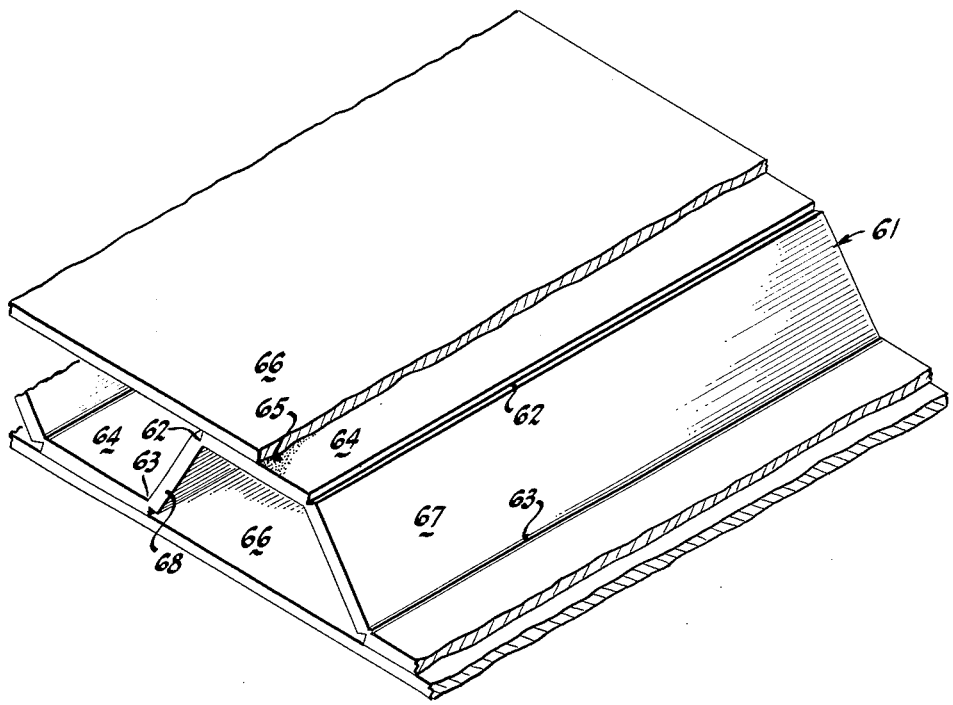
FIGURE 18 is a view in perspective of a composite board structure wherein the intermediate corrugated medium is sharply folded about lines of weakness to provide a modified flute structure.

FIGURE 18 illustrates a trapezoidal shaped corrugated medium 61 of folded sharply at sharp fold lines 62 and 63 and adhesively secured at the resulting apex 64 determined by the fold lines 62 and 63 by means of adhesive 65 to liners or facing sheets 66. It will be noted, as in the previously described V-shaped embodiments, trapezoidal walls 67 and 68 are planar and flat and that the distance between adjacent consecutive sharp fold lines 62 and 63 defining any given side wall 67 or 68 is exactly equal to the height of the inclined trapezoidal side therebetween. As in the previously described V-shaped embodiments, the sharp fold lines 62 and 63 of the trapezoidal configurations may be defined by folds, creases, slit scores, perforations or other means of defining sharp fold lines.

Any suitable adhesive for permanently securing the composite structure, for example, in FIGURE 3 and other embodiments falling within the scope of invention, may be used. For example, conventional starch or silicate adhesives employing a vehicle or carrier of relatively high water content may be employed. While these and other types of water based adhesives have been found to be satisfactory, they have the disadvantage that the relatively high amounts of water must be driven out by drying before the adhesive is set. Such drying at customary high production speeds requires the use of relatively long drying sections operatively connected to the corrugated device. While present day conventional corrugating processes require the use of adhesives which are compatable with the high moisture inherent in the undulating corrugated medium the present invention is readily adaptable to other types of adhesives which may not necessarily be compatible with moisture laden corrugating medium since it has been found, as previously described, that the corrugating medium of the present invention may be formed without the addition of steam or moisture to render it flexible, as required in conventional corrugating methods. It is therefore possible to employ, for example, thermoplastic adhesives or adhesives for use in fabricating and combining composite board employing the present invention. Examples of thermoplastic adhesives include but are not limited to blends employing polyethylene and chlorinated polyphenyl. The latter types of thermoplastic adhesives are particularly advantageous since they may be formulated to be extremely rapid setting and thereby eliminate entirely or substantially reduce the need for adhesive drying sections as required in existing conventional corrugating devices. The latter type of thermoplastic adhesives are generally advantageous when used with corrugating mediums adapted to the present invention and which are impermeable to moisture, for example paper laminated to metal foil or plastic film.

In an advantageous method of forming and combining the corrugated board of the present invention as shown in FIGURE 17, a continuous web or sheet 70 of flexible corrugating medium is advanced from a supply roll 71 and passed between registering scoring rolls 72 and 73, which successively impress lines of weakness 74 alternately on opposite sides of the continuous web 70 in predetermined, regular spaced apart parallel lines. As hereinbefore described in greater detail, these lines of weakness 74 may in addition be mere embossments or scores be comprised of perforated lines, having alternately severed and unaltered portions, or may be comprised of slit scores which are substantially continuous cut lines which penetrate only partially through the sheet 70.

The continuous web 70 with the predetermined lines of weakness 74 thereon is advanced through a plaiting or gathering assembly 75 which in the device of FIGURE 17 is embodied in a gathering roll 76. The gathering roll 76 is rotatably mounted on a shaft 77 in a manner such that gathering pins 78 are free to move radially inwardly and outwardly as determined by a fixedly mounted eccentric 79, a guide ring 80 and a retaining shell 81 as the roll 76 is rotated about the shaft 77. Thus it may be seen that the outer extremities 82 of adjacent gathering pins 78 vary in their distance apart during the rotation of the gathering roll 76. As the prescored medium 70 is initially introduced between the extremities 82 of the pins 78 and the inner surface of the retaining shell 81, the extremities 82 are spaced apart an amount equal to the distance between alternate lines of weakness 74 and thus contact the web 70 at adjacent lines of weakness on one side thereof. As the gathering roll 76 is rotated the distance between the pin extremities 82 decreases successively folding the web 70 about the predetermined lines of weakness 74 into corrugated relationship until flutes 83 thus formed attain the precise dimensional conformation desired. At this point the now corrugated web 70 is transferred to a toothed roll 84. The circumference of the toothed roll is so formed as to register with and maintain the flutes 83 of the corrugated medium 70 in the precise predetermined configuration as adhesive 85 is applied to the tips of the flutes 83 by applicator means as for example glue rolls 86. Following the application of the adhesive 85 a liner or facing sheet 87 of flexible material is advanced from a supply roll 88 and brought into contact with the adhesively coated tips of corrugated medium 70 and bonded thereto by means of the pressure roll 89.

The composite structure material thus formed is comprised of a corrugated medium 70 and a smooth facing sheet or liner 87 and is similar to the commonly termed "single faced corrugated board." For most commercial applications in packaging or for other uses a second liner or "double facer" (not shown) is adhesively bonded to the opposite tips of the flutes 83 in a similar manner to obtain so-called "double faced board." In addition, multiple thickness composite structures may be formed including two or more corrugated mediums with intervening planar liners in accordance with the industry practice and commonly termed doublewall board.

The present invention is adapted to a wide range of materials and particularly paperboard materials such as used in the packaging industry as for example kraft or chipboards varying in caliper from about .006 to .032 inch Also, the invention while not so limited is capable of being formed in sizes similar to conventional corrugated flute formations as regards their amplitude and numbers of flutes per running foot of board. Such flute formations for example are commonly denoted "A," "B," "C," "D," and "E" and are well known in the art. While the preferred method of forming the board is described herein the composite flute structure of this invention may be formed by other methods, for example, the lines of weakness may be applied longitudinally of the continuous flexible corrugating web and the flutes formed by folding along such longitudinal lines of weakness. Further it is possible to form and fabricate the composite board structure of this invention by manual means or by means of other apparatus not specifically described herein.

The novel corrugated paperboard of the invention provides many advantages compared with the current universally used sine-like corrugated paperboard and solid fibreboard in the fabrication of carton walls for boxes and shipping containers of all kinds. For example, some of the advantages of the new composite paperboard compared with corrugated paperboard currently in use formed of substantially identical linerboard and medium with respect to caliper, weight and quality, are as follows:

It is a well recognized fact that in forming the corrugated medium in the present use by the container industry, the sheet must be initially steamed to render it pliable and after corrugating, passed over driers to remove the moisture. Furthermore, the sheet is unavoidably stretched, frequently causing flutes of uneven heights, weakened and sometimes even cracked or otherwise damaged in the process of its formation between corrugating rolls. By way of contrast the basic strength of the sheet which provides the sharp folded corrugated medium of the present invention is unaffected in the process of formation and fully utilized, since the sheet is not subjected to any stress or strain or steaming in its fabrication and the sharply folded corrugations are of uniform height and conformation. This advantage is of great importance since it obviously insures strength characteristics of the composite paperboard superior to the standard corrugated board of the same basis strength for whatever purpose it may be employed.

Thus in making this invention no stream treatment is required—as in present corrugated paperboard processes—as the corrugated medium of this invention is not deformed or bent except along sharp fold lines as described. The sharply folded corrugated medium of this invention may be folded manually if so desired and adhesively secured to at least one reinforcing sheet at the sharp fold lines thereof.

It is to be understood that the embodiments herein described are illustrative and not restrictive, and it is also to be understood that the invention may be susceptible of embodiments in other modified forms, and that all such modifications which are similar or equivalent hereto come equally within the scope of the claims next appearing.

What I claim is:

1. The method of making a composite corrugated paperboard structure including a flexible corrugated intermediate paper sheet having substantially negligible resistance to compressive forces exerted edgewise of the sheet prior to the formation thereof into the panel structure, the method including the steps of advancing a continuous web of the intermediate sheet from a roll thereof, successively applying spaced apart parallel lines of weakness on opposite sides of the web by partial severance of said web, alternately folding the web successively only about the predetermined lines of weakness into planar walled flute formation having successive alternately opposed apexes while maintaining the planar wall free of deformation, applying adhesive along said apexes, advancing a flexible web of facing material from a roll into successive contact with the apexes on one side of the corrugated intermediate sheet and into adhesive securement therewith.

2. The method of making a composite corrugated paperboard structure including a flexible corrugated intermediate paper sheet having substantially negligible resistance to compressive forces exerted edgewise of the sheet prior to the formation thereof into the panel structure, the method including the steps of advancing a continuous web of the intermediate sheet from a roll thereof, successively applying spaced apart parallel lines of weakness on opposite sides of the web by partial severance of said web to provide openings therein and exposing internal fibers, alternately folding the web successively only about the predetermined lines of weakness into planar walled flute formation having successive alternately opposed apexes while maintaining the planar wall free of deformation, applying adhesive along said apexes and in said apex openings, advancing a flexible web of facing material from a roll into successive contact with the apexes on one side of the corrugated intermediate sheet and into adhesive securement therewith.

3. The method of making a rigid corrugated laminated paperboard and foil product comprising at least one facing sheet and a corrugated member, the facing sheet and the corrugated member being individually thin flexible webs initially in roll form and bendable at random to form fold lines therein and having negligible resistance to compressive forces exerted edgewise of the sheet, the method including the steps of advancing a continuous web of the intermediate sheet from a roll thereof, applying spaced apart, parallel lines of weakness on successively alternate sides of the web by partial severance of said web, alternately folding the web only about the predetermined lines of weakness into planar walled flute formation having successive alternately opposed apexes while maintaining the planar wall free of deformation, applying adhesive along said apexes, advancing a flexible web of facing material from a roll into contact with the apexes on one side of the corrugated intermediate sheet and into adhesive securement therewith.

4. The method of making a rigid corrugated laminated paperboard and plastic product comprising at least one facing sheet and a corrugated member, the facing sheet and the corrugated member being individually thin flexible webs initially in roll form and bendable at random to form fold lines therein and having negligible resistance to compressive forces exerted edgewise of the sheet, the method including the steps of advancing a continuous web of the intermediate sheet from a roll thereof, applying spaced apart, parallel lines of weakness on successively alternate sides of the web by partial severance of said web, alternately folding the web only about the predetermined lines of weakness into planar walled flute formation having successive alternately opposed apexes while maintaining the planar wall free of deformation, applying adhesive along said apexes, advancing a flexible web of facing material from a roll into contact with the apexes on one side of the corrugated intermediate sheet and into adhesive securement therewith.

References Cited by the Examiner

UNITED STATES PATENTS

| | | |
|---|---|---|
| 308,352 | 11/1884 | Friend. |
| 707,183 | 8/1902 | Thiebaut. |
| 1,771,760 | 7/1930 | MacLellan. |
| 2,173,927 | 8/1939 | Allen. |
| 2,221,309 | 11/1940 | Gazelle _____ 161—137 XR |
| 2,348,703 | 5/1944 | Weir et al. _____ 161—137 XR |
| 2,405,527 | 8/1946 | Skolnik _____ 161—137 XR |
| 2,581,421 | 1/1952 | Lombard et al. ___ 156—211 XR |
| 3,044,921 | 7/1964 | Wentworth et al. ____ 156—197 |

FOREIGN PATENTS 911,063  2/1946  France.

ALEXANDER WYMAN, *Primary Examiner.*

EARL M. BERGERT, *Examiner.*